(12) United States Patent
Yano et al.

(10) Patent No.: US 11,329,288 B2
(45) Date of Patent: May 10, 2022

(54) SECONDARY BATTERY NEGATIVE ELECTRODE BINDER COMPOSITION, SECONDARY BATTERY NEGATIVE ELECTRODE, AND SECONDARY BATTERY

(71) Applicant: THE NIPPON SYNTHETIC CHEMICAL INDUSTRY CO., LTD., Osaka (JP)

(72) Inventors: Tomotake Yano, Osaka (JP); Mitsuo Shibutani, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/061,162

(22) PCT Filed: Dec. 15, 2016

(86) PCT No.: PCT/JP2016/087446
§ 371 (c)(1),
(2) Date: Jun. 11, 2018

(87) PCT Pub. No.: WO2017/104770
PCT Pub. Date: Jun. 22, 2017

(65) Prior Publication Data
US 2018/0366732 A1 Dec. 20, 2018

(30) Foreign Application Priority Data

Dec. 16, 2015 (JP) .............................. JP2015-245544
Dec. 21, 2015 (JP) .............................. JP2015-249076

(51) Int. Cl.
*H01M 4/62* (2006.01)
*C08L 29/04* (2006.01)
*H01M 4/134* (2010.01)
*C09D 129/04* (2006.01)
*H01M 4/1395* (2010.01)
*H01M 4/38* (2006.01)
*H01M 10/0525* (2010.01)
*H01M 4/40* (2006.01)
*H01M 4/04* (2006.01)
*H01M 4/02* (2006.01)

(52) U.S. Cl.
CPC ............ *H01M 4/622* (2013.01); *C08L 29/04* (2013.01); *C09D 129/04* (2013.01); *H01M 4/134* (2013.01); *H01M 4/1395* (2013.01); *H01M 4/382* (2013.01); *H01M 10/0525* (2013.01); *H01M 4/0404* (2013.01); *H01M 4/405* (2013.01); *H01M 2004/021* (2013.01); *H01M 2004/027* (2013.01)

(58) Field of Classification Search
CPC .... H01M 4/622; H01M 4/134; H01M 4/1395; H01M 4/382; H01M 10/0525; H01M 4/0404; H01M 4/405; C08L 29/04; C09D 129/04
See application file for complete search history.

(56) References Cited

U.S. PATENT DOCUMENTS

| | | | | |
|---|---|---|---|---|
| 5,698,339 A | * | 12/1997 | Kawakami | H01M 4/13 429/212 |
| 2002/0126439 A1 | * | 9/2002 | Sato | H01G 11/24 361/502 |
| 2007/0264568 A1 | * | 11/2007 | Ryu | H01M 4/386 429/213 |
| 2007/0275302 A1 | * | 11/2007 | Sotowa | H01M 4/587 429/217 |
| 2013/0323588 A1 | * | 12/2013 | Kajiwara | H01G 9/042 429/211 |
| 2017/0029540 A1 | * | 2/2017 | Fukuhara | C08F 114/06 |

FOREIGN PATENT DOCUMENTS

| | | | |
|---|---|---|---|
| JP | 2015-144124 A | 8/2015 | |
| TW | 201515309 | * 4/2015 | ............ H01M 4/134 |

OTHER PUBLICATIONS

International Search Report from Patent Application No. PCT/JP2016/087446, dated Mar. 14, 2017.
International Preliminary Report on Patentability from Patent Application No. PCT/JP2016/087446, dated Jun. 19, 2018.
Office Action issued in Chinese Patent Application No. 201680073618.8, dated May 6, 2021, English translation.
Office Action issued in Chinese Patent Application No. 201680073618.8, dated Sep. 23, 2021, English translation.

* cited by examiner

*Primary Examiner* — Helen Oi K Conley
(74) *Attorney, Agent, or Firm* — Greenblum & Bernstein, P.L.C.

(57) ABSTRACT

The present invention relates to a secondary battery negative electrode binder composition with which a stable negative electrode active material layer can be formed, which can follow volumetric changes in the negative electrode, whereby a secondary battery can be manufactured that achieves a high charge/discharge capacity and allows for improvement in charge/discharge cycle characteristics. Provided is a binder composition for fabricating a secondary battery negative electrode, containing an element capable of forming an alloy with lithium as an active material, which is a secondary battery negative electrode binder composition comprising an emulsion in which polymer particles derived from an ethylenically unsaturated monomer are dispersed in an aqueous solution of a polyvinyl alcohol-based resin, wherein the ratio of the polyvinyl alcohol-based resin/polymer particles is 60/40 to 99/1, as a weight ratio of resin solids.

20 Claims, No Drawings

SECONDARY BATTERY NEGATIVE ELECTRODE BINDER COMPOSITION, SECONDARY BATTERY NEGATIVE ELECTRODE, AND SECONDARY BATTERY

TECHNICAL FIELD

The present invention relates to a secondary battery negative electrode binder composition, a secondary battery negative electrode, and a secondary battery. More particularly, it relates to a binder composition that is used together with a negative electrode active material in order to constitute a negative electrode for a secondary battery, to a secondary battery negative electrode comprising said binder composition, and to a secondary battery having said secondary battery negative electrode.

BACKGROUND ART

Secondary batteries generally have a configuration wherein a positive electrode, in which a positive electrode active material layer including a positive electrode active material is formed on both sides of a positive electrode current collector, and a negative electrode, in which a negative electrode active material layer including a negative electrode active material is formed on both sides of a negative electrode current collector, are connected via an electrolyte layer, and these are housed in a battery case. Such electrodes are generally formed by applying a mixed slurry of an active material and an electrode binder to the surfaces of a current collector and drying.

Here, the electrode binder serves to bind the active material to itself and to bind the active material to a metal foil, which is the current collector. If the binder can not bind a sufficient amount of the active material to the current collector, or can not bind the active material to itself, a large capacity battery can not be produced. Furthermore, if the binding strength of the binder decreases due to volumetric changes in the active material or the like, as a result of repeated charging and discharging, there is a risk of the active material falling off the current collector, such that the capacity of the battery is lowered.

For secondary batteries, there is a trend in which increases in capacity are being demanded, particularly in automotive applications and the like, but there has been a problem in that battery capacities have been reduced due to deformation of the active material layer and the active material falling off, or separation from the current collector or the like, associated with repeated charging and discharging. There is, therefore, a need for a high-performance secondary battery electrode binder, which sufficiently binds the active material and the current collector with a small amount of binder.

Furthermore, increasing the density of the negative electrode active material layer has been studied, particularly in order to improve the energy density of the negative electrode, and there is demand for forming stable negative electrode active material layers that can follow volumetric changes in negative electrodes associated with winding during electrode fabrication and repeated charging and discharging. For reasons such as these as well, it is necessary to prevent brittle fractures and improve flexibility in the binder.

Meanwhile, in recent years, in place of graphite-based active materials, the use of active materials made from semimetals, metals and alloys thereof (hereinafter, also collectively referred to as "alloy-based active materials") as active materials for battery negative electrodes that allow for increased capacity is being studied. For example, Patent Literature 1 discloses that a binder composition comprising an emulsion using a polyvinyl alcohol-based resin having a 1,2-diol structural unit on a side chain as a dispersant is used for alloy-based active materials such as a silicon powder.

However, the volumetric expansion of alloy-based active materials is generally greater than that of graphite-based active materials and, for example, silicon (Si) active materials, which are known as alloy-based active materials, are known to bring about volumetric changes of as much as approximately 400% with charging and discharging. Due to such volumetric changes, the active material more readily separates from the electrode, such that it was difficult to obtain stably high charge capacities with binders including the conventional polyvinyl alcohol-based resin-containing emulsions that had been used with graphite-based active materials, and the charge/discharge cycle characteristics were not necessarily satisfactory.

CITATION LIST

Patent Literature

[Patent Literature 1] Japanese Unexamined Patent Application Publication No. 2015-144124

SUMMARY OF INVENTION

Technical Problem

The present invention was made in view of such circumstances, and objects thereof are: to provide a secondary battery negative electrode binder composition used for an alloy-based active material, with which a stable negative electrode active material layer can be formed, which can follow volumetric changes in the negative electrode due to repeated charging and discharging and the like, whereby a secondary battery can be manufactured that achieves a high charge/discharge capacity and allows for improvement in charge/discharge cycle characteristics; to provide a secondary battery negative electrode comprising said binder composition; and to provide a secondary battery having said secondary battery negative electrode.

Solution to Problem

As a result of earnest study, the present inventors have found that, in a binder composition comprising an emulsion in which polymer particles derived from an ethylenically unsaturated monomer are dispersed in an aqueous solution of a polyvinyl alcohol-based resin, by causing the ratio by weight of the polyvinyl alcohol-based resin/polymer particles to be within a specific range, a stable negative electrode active material layer that can follow volumetric changes in a negative electrode comprising an alloy-based active material can be formed, whereby a secondary battery can be produced, with which high charge/discharge capacities can be achieved, and with which charge/discharge cycle characteristics can be improved. Furthermore, it was found that, by causing the glass transition temperature of the polymer particles to be within a specific range, a secondary battery can be produced in which the negative electrode active material layer better follows volumetric changes in the negative electrode, so as to provide a more stable negative electrode active material layer, and thus the present invention was completed.

That is to say, the gist of the present invention is a binder composition for fabricating a secondary battery negative electrode, containing an element capable of forming an alloy with lithium as an active material, which is a secondary battery negative electrode binder composition comprising an emulsion in which polymer particles derived from an ethylenically unsaturated monomer are dispersed in an aqueous solution of a polyvinyl alcohol-based resin, wherein the ratio of the polyvinyl alcohol-based resin/polymer particles is 60/40 to 99/1, as a weight ratio of resin solids.

In the secondary battery negative electrode binder composition of the present invention, the glass transition temperature of the polymer particles is preferably −40 to 60° C.

Hereinafter, the "secondary battery negative electrode binder composition" may be referred to simply as "negative electrode binder composition."

Furthermore, the gist of the present invention also resides in a secondary battery negative electrode comprising the secondary battery negative electrode binder composition of the present invention, and in a secondary battery comprising the secondary battery negative electrode of the present invention.

Advantageous Effects of Invention

Because the secondary battery negative electrode binder composition of the present invention comprises an emulsion containing a polyvinyl alcohol-based resin and polymer particles derived from an ethylenically unsaturated monomer at a specific weight ratio, the binding between alloy-based active materials and the current collector is excellent, and the negative electrode active material layer (hereinafter, also referred to as the "coating") containing said binder composition and an alloy-based active material has a good balance between elastic modulus and flexibility. Accordingly, in the negative electrode active material layer containing said binder composition and an alloy-based active material, the alloy-based active material does not readily separate or fall off due to volumetric changes in the negative electrode associated with repeated charging and discharging and the like, and can follow volumetric changes in the negative electrode, and thus by using a secondary battery negative electrode containing said binder composition, high charge/discharge capacities can be stably produced, and it is also possible to manufacture a secondary battery having excellent charge/discharge cycle characteristics.

Furthermore, by adjusting the glass transition temperature of the polymer particles in the secondary battery negative electrode binder composition of the present invention to a specific range, a more stable negative electrode active material layer can be formed, which can better follow volumetric changes in the negative electrode associated with repeated charging and discharging and the like, such that it is possible to manufacture a secondary battery having even better charge/discharge cycle characteristics.

It is not clear why the active material binding of the secondary battery negative electrode containing the secondary battery negative electrode binder composition of the present invention is good, but this is presumed to be for the following reasons.

The present binder composition is a resin composition comprising an emulsion containing a polyvinyl alcohol-based resin and polymer particles, but by arbitrarily controlling the ratio of this polyvinyl alcohol-based resin component and this polymer particle component to within a specific range, the elastic modulus and the flexibility of the coating, as well as the metal adhesion and the like can be controlled. For example, it is also possible to design a highly elastic coating by increasing the polyvinyl alcohol-based resin component, or to design highly flexible coating by increasing polymer particle component.

Furthermore, by adjusting the glass transition temperature of these polymer particles to within a specific range, the elastic modulus and flexibility of the coating, as well as metal adhesion and the like can be controlled.

In general, it was thought that, in terms of binders, coating compositions with large amounts of polymer particles to have more flexibility would be able to follow volumetric changes in the electrode. The reason for this is that it is thought that a flexible binder resin relaxes stress against volumetric changes associated with charging and discharging of the active material, whereby cracking of the binder and structural changes in the electrode are prevented, and thus cycle characteristics are improved.

Meanwhile, however, because the volumetric changes associated with charging and discharging are excessively large with alloy-based active materials, as compared to graphite-based active materials, a flexible binder does not readily completely follow structural changes in the electrode.

Here, the present invention was completed by designing a resin with a composition that is suitable when alloy-based active materials are used, which while ensuring an elastic modulus that is high enough that, if there are volumetric changes in the active material, the electrode structure will not change greatly in the first place, also combines flexibility that can suppress cracking of the binder and falling off of the active material associated with changes of the electrode.

With the technical idea described above, as differs from common conventional binder design ideas, when alloy-based active materials are used for negative electrodes, surprisingly, it was found that a stably higher charge/discharge capacity is demonstrated with higher ratios of polyvinyl alcohol-based resin, and that a battery with excellent charge/discharge cycle characteristics can be produced.

However, as a result of increasing the ratio of the polyvinyl alcohol-based resin, brittle fracture will more readily occur due to the decreased flexibility of the binder coating, and it is possible that the negative electrode active material layer will fall off in the battery fabrication stage, or due to volumetric changes associated with charging and discharging, such that the battery capacity is ultimately lowered.

Here, it was understood that, by adjusting the glass transition temperature of the polymer particles to within a specific range, because the binder coating strength will be higher, and the negative electrode active material layer will be better able to follow volumetric changes in the negative electrode, a more stably high charge/discharge capacity is consequently demonstrated, and that a battery with more excellent charge/discharge cycle characteristics can be produced.

DESCRIPTION OF EMBODIMENTS

The description of the constituent elements set forth below is one example (a representative example) of an embodiment of the present invention, and the present invention is not limited to these specifics.

Note that, in the present specification, when there is no particular distinction between acrylic and methacrylic, the general term "(meth)acrylic" is used, and when there is no particular distinction between acrylate and methacrylate, the general term "(meth)acrylate" is used.

In the present invention, the term "solids" means that obtained by providing the substance in question to a loss-on-drying method at 105° C. for 3 hours.

<Secondary Battery Negative Electrode Binder Composition>

The secondary battery negative electrode binder composition of the present invention is a binder composition for fabricating a secondary battery negative electrode, containing an element capable of forming an alloy with lithium as an active material, wherein the binder composition comprises an emulsion in which polymer particles derived from an ethylenically unsaturated monomer are dispersed in an aqueous solution of a polyvinyl alcohol-based resin.

The polymer particles can be obtained, for example, by emulsion polymerization of an ethylenically unsaturated monomer in an aqueous dispersion medium, using the aforementioned PVA-based resin as a dispersant. This is described in detail below.

[Description of Polymer Particles: Ethylenically Unsaturated Monomer]

The polymer in the polymer particles is a polymer of an ethylenically unsaturated monomer. Examples of the ethylenically unsaturated monomer include the following (a) to (m), and the like. These may be used alone or in combinations of two or more.

(a) A (meth)acrylic acid alkyl ester.
(b) A hydroxyl group-containing ethylenically unsaturated monomer.
(c) A carboxyl group-containing ethylenically unsaturated monomer.
(d) An epoxy group-containing ethylenically unsaturated monomer.
(e) A methylol group-containing ethylenically unsaturated monomer.
(f) An alkoxyalkyl group-containing ethylenically unsaturated monomer.
(g) A cyano group-containing ethylenically unsaturated monomer.
(h) An ethylenically unsaturated monomer having two or more radically polymerizable double bonds.
(i) An ethylenically unsaturated monomer having an amino group.
(j) An ethylenically unsaturated monomer having a sulfonic acid group.
(k) An ethylenically unsaturated monomer having a phosphoric acid group.
(l) An aromatic ethylenically unsaturated monomer.
(m) A fatty acid ester-based unsaturated monomer.

In addition to the aforementioned (a) to (m), monomers such as vinyl pyrrolidone, methyl vinyl ketone, butadiene, ethylene, propylene, vinyl chloride and vinylidene chloride can also be used as appropriate, in keeping with needs.

Next, the monomers set forth by way of example in the aforementioned (a) to (m) will be described in detail.

Examples of the (meth)acrylic acid alkyl ester (a) include aliphatic (meth)acrylates such as methyl (meth)acrylate, ethyl (meth)acrylate, propyl (meth)acrylate, isopropyl (meth)acrylate, butyl (meth)acrylate, isobutyl (meth)acrylate, n-hexyl (meth)acrylate, cyclohexyl (meth)acrylate, 2-ethylhexyl (meth)acrylate, and lauryl (meth)acrylate, and preferably aliphatic (meth)acrylates with alkyl groups having 1 to 20 carbon atoms, aromatic (meth)acrylates such as benzyl (meth)acrylate and phenyl (meth)acrylate, and the like, which may be used alone or in combinations of two or more. Among these, aliphatic (meth)acrylates with alkyl groups having 1 to 10 carbon atoms such as butyl (meth) acrylate, 2-ethylhexyl (meth)acrylate, methyl (meth)acrylate, and cyclohexyl (meth)acrylate are preferred.

Examples of the hydroxyl group-containing ethylenically unsaturated monomer (b) include hydroxyalkyl (meth)acrylates such as hydroxyethyl (meth)acrylate and hydroxypropyl (meth)acrylate, poly alkylene glycol (meth)acrylates such as polyethylene glycol (meth) acrylate and the like, which may be used alone or in combinations of two or more. Among these, hydroxyalkyl (meth)acrylates with hydroxyalkyl groups having 2 to 4 carbon atoms and polyalkylene glycol (meth)acrylates with alkylene groups having 2 to 4 carbon atoms are preferred, and hydroxyethyl (meth)acrylate is particularly preferred.

Examples of the carboxyl group-containing ethylenically unsaturated monomer (c) include monocarboxylic acid monomers such as (meth)acrylic acid, crotonic acid and undecylenic acid, dicarboxylic acids such as maleic acid, fumaric acid and itaconic acid, as well as anhydride monomers thereof and the like. (Meth)acrylic acid is preferred. These may be used alone or in combinations of two or more. Among these, (meth)acrylic acid and itaconic acid are more preferred. Note that, in the case of dicarboxylic acids such as maleic acid, fumaric acid and itaconic acid, monoesters and monoamides of these can also be used.

Examples of the epoxy group-containing ethylenically unsaturated monomer (d) include glycidyl (meth)acrylate, allyl glycidyl ether, methyl glycidyl (meth)acrylate and the like, which may be used alone or in combinations of two or more. Among these, glycidyl (meth)acrylate is preferred.

Examples of the methylol group-containing ethylenically unsaturated monomer (e) include N-methylol (meth) acrylamide, dimethylol (meth)acrylamide and the like, which may be used alone or in combinations of two or more.

Examples of the alkoxyalkyl group-containing ethylenically unsaturated monomer (f) include alkoxyalkyl (meth)acrylates such as N-methoxymethyl (meth)acrylamide, N-butoxymethyl (meth)acrylamide, methoxyethyl (meth)acrylate, methoxypropyl (meth)acrylate, ethoxyethyl (meth)acrylate and ethoxypropyl (meth)acrylate, and polyalkylene glycol monoalkoxy (meth)acrylates such as polyethylene glycol monomethoxy (meth)acrylate, which may be used alone or in combinations of two or more.

In terms of the cyano group-containing ethylenically unsaturated monomer (g), for example, an α,β-unsaturated nitrile compound is used. Specific examples include acrylonitrile-based monomers such as acrylonitrile, methacrylonitrile, α-chloroacrylonitrile and α-ethylacrylonitrile; vinyl monomers disubstituted with cyano groups such as vinylidene cyanide; unsaturated group-containing cyanoacrylates such as methyl cyanoacrylate, ethyl cyanoacrylate and butyl cyanoacrylate, as well as tetracyanoquinodimethane, 2,2-diarylmalononitrile and the like. Among these, acrylonitrile-based monomers are preferred, (meth)acrylonitrile is particularly preferred, and acrylonitrile is still more preferred. Nitrile-based monomers may be used alone or in combinations of two or more.

Examples of the ethylenically unsaturated monomer having two or more radically polymerizable double bonds (h) include di(meth)acrylates, tetra(meth)acrylates and conjugated diene-based monomers, examples of di(meth)acrylates including divinylbenzene, polyoxyethylene di(meth)acrylate, polyoxypropylene di(meth)acrylate, neopentyl glycol di(meth)acrylate and butanediol di(meth)acrylate. Furthermore, tetra(meth)acrylates include tri(meth)acrylates such as trimethylolpropane tri(meth)acrylate, pentaerythritol tetra(meth)acrylate and the like.

Examples of conjugated diene-based monomers include hydrocarbon conjugated diene-based monomers such as 1,3-butadiene, isoprene, 2,3-dimethyl-1,3-butadiene, 1,3-pentadiene, 1,3-hexadiene, 1,3-heptadiene, 2,3-dimethylbutadiene, 2-phenyl-1,3-butadiene, 3-methyl-1,3-pentadiene, and 1,3-hexadiene; halogen-containing conjugated diene-based monomers such as 2-chloro-1,3-butadiene; substituted linear conjugated pentadienes; and substituted and side-chain conjugated hexadienes. Among these, conjugated diene-based monomers having 4 to 6 carbon atoms are preferred, and 1,3-butadiene is particularly preferred.

These ethylenically unsaturated monomers having two or more radically polymerizable double bonds (h) can be used alone or in combinations of two or more.

Examples of the ethylenically unsaturated monomer having an amino group (i) include (meth)acrylamide, N, N-dialkylaminoalkyl (meth)acrylates such as N, N-dimethylaminoethyl (meth)acrylate and N,N-diethylaminoethyl (meth)acrylate and the like, which may be used alone or in combinations of two or more. Among these, (meth)acrylamide is preferred.

Examples of the ethylenically unsaturated monomer having a sulfonic acid group (j) include vinyl sulfonic acid, vinyl styrene sulfonic acid (salts) and the like, which may be used alone or in combinations of two or more.

Examples of the ethylenically unsaturated monomer having a phosphoric acid group (k) include vinylphosphonic acid, vinylphosphate, acid phosphoxyethyl (meth)acrylate, acid phosphoxypropyl (meth)acrylate, bis[(meth)acryloyloxyethyl]phosphate, diphenyl-2-(meth)acryloyloxyethyl phosphate, dibutyl-2-(meth)acryloyloxyethyl phosphate, dioctyl-2-(meth)acryloyloxyethyl phosphate, and the like, which may be used alone or in combinations of two or more.

Examples of the aromatic ethylenically unsaturated monomer (l) include styrene, vinyltoluene, α-methylstyrene and the like, which may be used alone or in combinations of two or more. Among these, styrene is preferred.

Examples of the fatty acid ester-based unsaturated monomer (m) include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate, and the like. These may be used alone or in combinations of two or more.

The content thereof is the same as the charged weight of the monomer that is charged in manufacturing of the emulsion used in the present invention. The charged weight of such monomers is usually 5 to 100 wt %, preferably 20 to 100 wt %, and particularly preferably more than 30 to 80 wt %, of the polymer particles, depending on the intended constitution of the polymer particles.

The polymer particles may contain structural units derived from monomers other than those set forth above (hereinafter also referred to simply as "other monomers"). The content of the other monomers is usually 0 to 95 wt %, preferably 0 to 80 wt %, and particularly preferably 0 to 70 wt %, with respect to the polymer particles. Note that, the content of structural units derived from the other monomers is proportional to the charged weight of the other monomers charged when manufacturing the emulsion included in the secondary battery negative electrode binder composition of the present invention.

The charged amount of the other monomers is usually 0 to 95 wt %, preferably 0 to 80 wt %, particularly preferably 0 to 70 wt %, with respect to the polymer particles, depending on the intended constitution of the polymer particles.

In the present invention, the glass transition temperature (hereinafter, also referred to as Tg) of the polymer particles is preferably from −40 to 60° C., particularly preferably from −35 to 57° C., still more preferably from −30 to 55° C.°, and especially preferably −25 to 50° C. If the glass transition temperature is too low, the emulsion polymerization tends to become unstable, depending on the composition of the monomers used, and if the glass transition temperature is too high, the binder coating will be prone to brittle fracture, and there is a tendency for the cycle characteristics when charging and discharging to be more readily decreased.

Note that the glass transition temperature of the polymer particles can be controlled by known methods, such as selecting the ethylenically unsaturated monomer constituting the polymer particles, adjusting the polymerization ratio thereof and the like.

If two or more monomers are used, the monomer composition ratio is preferably used adjusted so that the Tg of the copolymer is within such a temperature range.

The Tg (° C.) of the copolymer obtained when two or more monomers are used can be found, for example, by way of the differential thermal analysis method described below. Note that the value for the reversible heat flow in the second cycle measured in modulation mode is employed for the Tg (° C.) of the copolymer in the present invention.

Analyzer: "DSC Q 2000" made by TA Instruments Inc.
Measurement range
1st: −30 to 215° C.
2nd: −30 to 230° C.
Rate of temperature increase: 5° C./min
Rate of temperature decrease: 10° C./min
Modulation period: every 60 seconds
Temperature amplitude: +/−0.80° C.

[Aqueous Solution of Polyvinyl Alcohol-Based Resin]

The PVA-based resin in the aqueous solution of PVA-based resin in which the polymer particles are dispersed is an ordinary, known water-soluble PVA-based resin.

Such a PVA-based resin is produced by polymerizing a vinyl ester-based monomer and saponifying this.

Vinyl ester-based monomers include vinyl acetate. Furthermore, other than vinyl acetate, for example, vinyl propionate, vinyl butyrate, vinyl caproate, vinyl caprylate, vinyl caprate, vinyl laurate, vinyl myristate, vinyl palmitate, vinyl stearate, vinyl cyclohexane carboxylate, vinyl pivalate, vinyl octylate, vinyl monochloroacetate, vinyl adipate, vinyl methacrylate, vinyl crotonate, vinyl sorbate, vinyl benzoate, vinyl cinnamate, trifluorovinyl acetate and the like can be given as examples, but from the point of view of price and availability, the use of vinyl acetate is preferred.

Polymerization of the vinyl ester-based monomer can be performed by way of any known polymerization method and, for example, this may be performed by way of solution polymerization, suspension polymerization, emulsion polymerization or the like. Among these, solution polymerization is preferably performed under reflux, whereby the reaction heat can be efficiently removed. Normally, an alcohol is used as the solvent for solution polymerization, and preferably a lower alcohol having 1 to 3 carbon atoms is used.

The copolymer produced can also be saponified by way of a known, conventionally practiced, saponification method. That is to say, this can be performed using an alkali catalyst or an acid catalyst with the polymer dissolved in alcohol or a water/alcohol solvent.

For example, alkali metal hydroxides and alcoholates such as potassium hydroxide, sodium hydroxide, sodium methylate, sodium ethylate, potassium methylate, lithium methylate and the like can be used as the alkali catalyst.

Normally, from the point of view of reaction rates and being able to reduce impurities such as fatty acid salts, use of a transesterification reaction employing an alkali catalyst in an anhydrous alcohol-based solvent is suitable.

The reaction temperature for the saponification reaction is usually 20 to 60° C. If the reaction temperature is too low, the reaction rate tends to decrease and the reaction efficiency tends to be inferior, while if this is too high, the boiling point of the reaction solvent may be exceeded, and in terms of manufacturing, the safety tends to inferior. Note that, if saponification is performed under high pressures using a tower-type continuous saponification tower that is capable of withstanding high pressures or the like, saponification at higher temperatures, such as 80 to 150° C., is possible, and thus a high degree of saponification can be achieved in a short time, even with a small amount of saponification catalyst.

The degree of saponification (measured in accordance with JIS K 6726) of the PVA-based resin is usually 80 to 100 mol %, particularly preferably 85 to 99.9 mol %, and more preferably 90 to 99.5 mol %. If the degree of saponification is too low, since the protective colloid properties of the PVA-based resin will be excessive, the viscosity of the emulsion will be too high or the PVA-based resin will exhibit a cloud point such that, for example, polymerization stability during emulsion polymerization is greatly lowered and it tends to be difficult to produce the intended emulsion. Furthermore, if the degree of saponification is low, the PVA-based resin is prone to swelling with electrolytic solutions, and as a result, binding between electrode members tends to be inferior. On the other hand, PVA-based resins having a high degree of saponification, and particularly those that are fully saponified, tend to be difficult to produce industrially.

The viscosity-average degree of polymerization (measured in accordance with JIS K 6726) is usually 50 to 2500, preferably 100 to 1700, and particularly preferably 100 to 1300. If the viscosity-average degree of polymerization is too low, the protective colloid function for the acrylic monomers or the like tends to be inferior, while if this is too high, the viscosity of the polymerization reaction solution will be too high, such that stirring during polymerization will be difficult, and thus polymerization tends to be difficult. Furthermore, due to excessive protective colloid properties, for example, monomers added dropwise during emulsion polymerization are not readily absorbed in the polymerized particles, such that many new particles are formed from the monomers added dropwise, and as a result the amount of coarse particles in the emulsion tends to increase.

The PVA-based resin may have a structural unit derived from a monomer other than a vinyl ester-based monomer, within a range that does not detract from the effect of the present invention (for example, 10 mol % or less, and preferably 5 mol % or less).

Examples include: monomers having a vinyl group and an epoxy group, such as glycidyl (meth)acrylate, glycidyl (meth)allyl ether, 3,4-epoxycyclohexyl (meth)acrylate, and allyl glycidyl ether; monomers having two or more allyl groups such as triallyl oxyethylene, diallyl maleate, triallyl cyanurate, triallyl isocyanurate, tetraallyl oxyethane, diallyl phthalate, triallyl cyanurate, triallyl isocyanurate, tetraallyl oxyethane, and diallyl phthalate; allyl ester-based monomers such as allyl acetate, acetoacetic acid vinyl ester, acetoacetic acid allyl ester, and diacetoacetic acid allyl ester; acetoacetoxyalkyl (meth)acrylates such as acetoacetoxyethyl (meth) acrylate and acetoacetoxypropyl (meth)acrylate; acetoacetoxyalkyl crotonate such as acetoacetoxyethyl crotonate and acetoacetoxypropyl crotonate; 2-cyanoacetoacetoxyethyl (meth)acrylate; divinylbenzene; alkylene glycol (meth)acrylates such as ethylene glycol di(meth)acrylate, 1,2-propylene glycol di(meth)acrylate, 1,3-propylene glycol di(meth)acrylate, 1,4-butanediol di(meth)acrylate, 1,6-hexanediol di(meth)acrylate, and neopentyl glycol di(meth) acrylate; trimethylolpropane tri(meth)acrylate; allyl (meth) acrylate; hydroxyalkyl (meth)acrylates such as 2-hydroxyethyl (meth)acrylate, hydroxypropyl (meth)acrylates and 4-hydroxybutyl (meth)acrylate (the alkyl moieties are $C_1$ to $C_{10}$ alkyl groups, and preferably $C_1$ to $C_6$ alkyl groups); nitrile-based monomers such as (meth)acrylonitrile; styrene-based monomers such as styrene and α-methylstyrene; olefins such as ethylene, propylene, 1-butene, and isobutene; halogenated olefins such as vinyl chloride, vinylidene chloride, vinyl fluoride, and vinylidene fluoride; olefinic monomers such as ethylene sulfonic acid; diene-based monomers such as butadiene-1,3,2-methylbutadiene, 1,3 or 2,3-dimethylbutadiene-1,3,2-chlorobutadiene-1,3; hydroxyl group-containing α-olefins such as 3-buten-1-ol, 4-penten-1-ol, 5-hexen-1,2-diol, and glycerin monoallyl ether and derivatives thereof such as acylates thereof; hydroxymethyl vinylidene diacetates such a 1,3-diacetoxy-2-methylenepropane, 1,3-dipropionyloxy-2-methylenepropane, and 1,3-dibutyronyloxy-2-methylenepropane; unsaturated acids such as itaconic acid, maleic acid, and acrylic acid, salts thereof or mono or dialkyl esters thereof; nitriles such as acrylonitrile, amides such as methacrylamide and diacetone acrylamide, olefin sulfonic acids such as ethylene sulfonic acid, allylsulfonic acid, methallylsulfonic acid, and AMPS, or compounds such as salts thereof, vinyl alkyl dialkoxysilanes such as vinyl triethoxysilane, vinyl trimethoxysilane, vinyl tripropoxysilane, vinyl tributoxysilane, vinyl methyldimethoxysilane, and vinyl methyldiethoxysilane; γ-(meth)acryloxypropyltrialkoxysilanes such as γ-(meth)acryloxypropyltrimethoxysilane and γ-(meth) acryloxypropyltriethoxysilane; γ-(meth)acryloxypropylalkyl dialkoxysilanes, such as γ-(meth)acryloxypropylmethyldimethoxysilane and γ-(meth)acryloxypropylmethyldiethoxysilane; vinyl-tris(β-methoxyethoxy)silane, and hydroxymethylvinylidene diacetate. Specific examples of hydroxymethylvinylidene diacetate include 1,3-diacetoxy-2-methylene propane, 1,3-dipropionyloxy-2-methylene propane, 1,3-dibutyronyloxy-2-methylenepropane and the like. These monomers may be used alone, or in combinations of two or more.

Furthermore, the PVA-based resin of the present invention may contain a modified PVA-based resin within a range that does not detract from the effect of the present invention (usually 15 mol % or less, and preferably 10 mol % or less), and examples of the modified PVA-based resin include formalized products, acetalized products, acetoacetylated products, butyralized products, urethanized products, and esterified products with a sulfonic acid or a carboxylic acid or the like, of the PVA-based resin.

In the present invention, it is particularly preferred to use a modified PVA-based resin, which has been modified with a hydroxyl group-containing α-olefin and derivatives thereof such as an acylated product, as the PVA-based resin contained in the emulsion.

For example, it is preferable to use a modified PVA-based resin containing a structural unit having a primary hydroxyl group on a side chain as the modified PVA-based resin. The number of primary hydroxyl groups in such a structural unit is usually 1 to 5, preferably 1 to 2, and particularly preferably 1. Furthermore, it is preferable that, in addition to the primary hydroxyl group, this has a secondary hydroxyl group.

Examples of such a modified PVA-based resin containing a structural unit having a primary hydroxyl group on a side chain include a modified PVA-based resin having a 1,2-diol structural unit on a side chain, and a modified PVA-based resin having a hydroxyalkyl group structural unit on a side chain. Among these, it is preferable to use a modified PVA-based resin containing a 1,2-diol structural unit on a side chain (hereinafter also referred to as "side chain 1,2-diol structural unit-containing modified PVA based resin") represented by the following General Formula (1).

[Chem. 1]

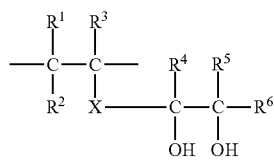

(1)

(In General Formula (1) above, $R^1$ to $R^6$ each independently represents a hydrogen atom or an organic group, and X represents a single bond or a joining chain.)

In General Formula (1) above, $R^1$ to $R^6$ each independently represents a hydrogen atom or an organic group. $R^1$ to $R^6$ are preferably all hydrogen atoms, but may be organic groups, so long as these are in amounts that will not greatly degrade the resin properties. While there are no particular limitations on the organic groups, for example, alkyl groups having 1 to 4 carbon atoms, such as a methyl group, ethyl group, n-propyl group, isopropyl group, n-butyl group, isobutyl group, or tert-butyl group are preferred, and may have substituents such as a halogen group, a hydroxyl group, an ester group, a carboxylic acid group, and a sulfonic acid group, as necessary.

In General Formula (1) above, X is a single bond or a joining chain, and a single bond is preferred with a view to resistance to electrolytic solutions, as a result of reduced free volume (intermolecular voids) in the amorphous parts (which is to say, physical properties with which swelling by the electrolytic solution does not readily occur). There are no particular limitations on the joining chain, and examples include, hydrocarbons such as alkylenes, alkenylenes, alkynylenes, phenylenes, and naphthylenes (these hydrocarbons may be substituted with halogens such as fluorine, chlorine, bromine or the like), as well as —O—, —(CH$_2$O)m-, —(OCH$_2$)m-, —(CH$_2$O)mCH$_2$-, —CO—, —COCO—, —CO(CH$_2$)mCO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, —OAl(OR)O— and the like. R is each independently, a hydrogen atom or any substituent, and is a preferably a hydrogen atom or an alkyl group (particularly a C$_1$ to C$_4$ alkyl group). Furthermore, m is a natural number, and preferably 1 to 10.

Among these, an alkylene group having 6 or fewer carbon atoms, and particularly a methylene group, or —CH$_2$OCH$_2$— is preferred in terms of heat resistance and viscosity stability during manufacture and the like.

A particularly preferred structure for the 1,2-diol structural unit represented in General Formula (1) above is one wherein all of $R^1$ to $R^6$ are hydrogen atoms, and X is a single bond. That is to say, the structural unit represented by the following structural formula (1a) is particularly preferred.

[Chem. 1a]

(1a)

Such a side chain 1,2-diol structural unit-containing modified PVA-based resin can be produced by a known production method. For example, it can be produced by the methods described in JP 2002-284818 A, JP 2004-285143 A, and JP 2006-095825 A. That is to say, it can be manufactured by: (i) a method in which a copolymer of a vinyl ester-based monomer and a compound represented by the following General Formula (2) is saponified; (ii) a method in which a copolymer of a vinyl ester-based monomer and a vinyl ethylene carbonate represented by the following General Formula (3) is saponified and decarboxylated; (iii) a method in which a copolymer of a vinyl ester-based monomer and 2,2-dialkyl-4-vinyl-1,3-dioxolane represented by the following General Formula (4) is saponified and deketalized; or the like.

[Chem. 2]

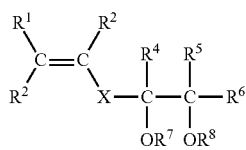

(2)

[Chem. 3]

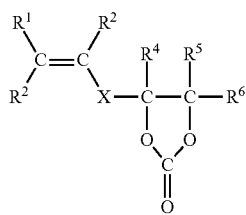

(3)

[Chem. 4]

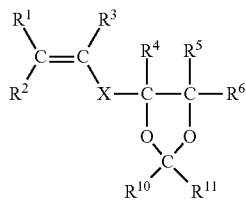

(4)

In General Formulas (2), (3) and (4), all of $R^1$ to $R^6$ are the same as in the case of General Formula (1). $R^7$ and $R^8$ are each independently hydrogen or $R^9$—CO— (where $R^9$ is an alkyl group having 1 to 4 carbon atoms); $R^{10}$ and $R^{11}$ are each independently a hydrogen atom or an organic group, and the organic group is the same as in the case of General Formula (1).

Among the aforementioned methods, method (i) is preferred in terms of having excellent copolymerization reactivity and industrial handling, and in particular, it is preferable to use 3,4-diacyloxy-1-butene, where $R^1$ to $R^6$ are hydrogens, X is a single bond, and $R^7$ and $R^8$ are $R^9$—CO—, $R^9$ being an alkyl group, and among these, it is particularly preferable to use 3,4-diacetoxy-1-butene, where $R^9$ is a methyl group.

Note that if the side chain 1,2-diol structural unit-containing modified PVA-based resin produced by method (ii) or (iii) has a low degree of saponification, or if the decarboxylation or deacetalization is insufficient, carbonate rings or acetal rings may sometimes remain in the side chains. When such a PVA-based resin is used as a dispersant, the proportion of coarse particles in the polymer particles produced tends to increase. For this reason as well, the PVA-based resin produced by method (i) is particularly suitable for the present usage.

If the PVA-based resin contains the aforementioned 1,2-diol structural unit, in terms of grafting of the PVA-based resin to the ethylenically unsaturated polymer particles that serve as the dispersoid during emulsion polymerization, resistance to electrolytic solutions, emulsion storage stability and the like, the content thereof is usually from 0.5 to 15 mol %, preferably from 1 to 10 mol %, and particularly preferably from 1 to 8 mol %. If the content is too low, the grafting ratio of the PVA-based resin to the ethylenically unsaturated polymer particles that serve as the dispersoid will be low, and the resistance to electrolytic solutions and emulsion storage stability tend to be inferior, while if the content is too great, the internal resistance when charging and discharging tends to increase.

Note that, the content ratio of the 1,2-diol structural units in the PVA-based resin is found from the $^1$H-NMR spectrum (solvent: DMSO-d6, internal standard: tetramethylsilane) for PVA-based resin with a degree of saponification of 100 mol %. Specifically, this can be calculated from peak areas resulting from hydroxyl group protons, methine protons and methylene protons in the 1,2-dial structural unit, methylene protons in the main chain, protons in hydroxyl groups connected to the main chain, and the like.

The solvent for the aqueous solution of PVA-based resin is water. This solvent may contain an organic solvent that is miscible with water within a range that does not impair dissolution of the PVA-based resin (for example, 20 wt % or less, and preferably 10 wt % or less of the solvent).

Examples of such an organic solvent include amide-based solvents such as N-methylpyrrolidone (NMP), dimethylformamide, dimethylacetamide and methylformamide, sulfoxides such as dimethyl sulfoxide, lower alcohols having 1 to 3 carbon atoms such as methanol and ethanol, alcoholic solvents such as 1,1,1,3,3,3-hexafluoro-2-propanol and the like.

[Binder Composition Based on Post-Addition Formulation of the PVA]

The emulsion in which the polymer particles derived from the ethylenically unsaturated monomer in the present invention are dispersed in the aqueous solution of the PVA-based resin can be produced by dispersing the aforementioned polymer particles in the aforementioned aqueous solution of the PVA-based resin.

In particular, when emulsion polymerization is performed with an ethylenically unsaturated monomer as a dispersoid, using a known dispersant, and using the aforementioned solvent as a dispersion medium, an emulsion can be efficiently produced in which the polymer particles are dispersed in the dispersion medium with good dispersion characteristics.

It is also possible to further dissolve the PVA-based resin in such an emulsion, or admix a solution in which PVA-based resin is dissolved. At this time, in addition to the PVA-based resin that was used for preparing the emulsion, it is also possible to use different types of PVA-based resins. In terms of the PVA-based resin that is subsequently added to the prepared emulsion composition (also referred to as the second PVA-based resin, for convenience) it is possible to use known PVA-based resins, in the same manner as with the aforementioned PVA-based resin serving as the dispersant. Furthermore within a range that does not detract from the object of the present invention, as with the aforementioned PVA-based resin serving as the dispersant, it is also possible to use modified PVA-based resins for the second PVA-based resin. In terms of achieving good emulsion stability, the second PVA-based resin preferably includes the aforementioned 1,2-diol structural unit.

When the emulsion in the present invention is produced, it is also possible to use mutually different types of PVA-based resin for the PVA-based resin that serves as a polymer particle dispersant (also referred to as the first PVA-based resin, for convenience) and for the PVA-based resin in the aqueous solution of the PVA-based resin for the emulsion (second PVA-based resin). At this time, in the negative electrode that is produced by using the resulting negative electrode binder composition, these PVA-based resins will be completely compatible with each other (sea-sea structure) and form a homogeneous phase, or form a sea-island structure.

In this case, from the viewpoint of the strength of the continuous layer of the binder in the negative electrode, if a sea-island structure is formed, it is preferable that the domain size to be controlled so as to be small (ordinary domain diameter: 1.5 μm or less). From such a viewpoint, the difference in the degrees of saponification of the first PVA-based resin and the second PVA-based resin is usually 0 to 15 mol %, preferably 0 to 10 mol %.

Furthermore, the degree of saponification of the second PVA-based resin is preferably 85 to 100 mol %, and particularly preferably 90 to 99.9 mol %. If this degree of saponification is too low, the second PVA-based resin will be prone to swelling with electrolytic solutions, and as a result, binding between electrode members will tend to be inferior.

Note that the expression, weight of the PVA-based resin, in the present invention, indicates the total weight of the first PVA-based resin and the second PVA-based resin.

[Synthesis of Emulsion by Way of Emulsion Polymerization with PVA as Emulsifier]

Examples of methods for performing the emulsion polymerization include: i) a method of emulsion polymerization by blending ethylenically unsaturated monomers serving as a dispersoid, at one time or continuously, in the presence of water, a dispersant and a polymerization catalyst, and heating and stirring; ii) a method of emulsion polymerization by preparing a dispersion solution in which ethylenically unsaturated monomers have been mixed and dispersed in a dispersion medium, blending this prepared dispersion solution, at one time or continuously, in a system in which water, a dispersant, and a polymerization catalyst have been blended, and heating and stirring, or the like. The method in which dispersion solution that has been prepared in advance in this way is used, in particular, referred to as a pre-emulsion method. This method is preferred because it is possible to perform emulsion polymerization while maintaining productivity, even if the composition of the monomers to be polymerized is complicated.

The dispersion medium in the reaction solution used for the emulsion polymerization is usually water. If desired, it is also possible to use an organic solvent capable of mixing with water, as listed above for solvents, in combination with water. However, from the viewpoint of the dispersibility of the monomers that are supplied to the emulsion polymerization, water alone is preferred.

In particular, in the present invention, in order to cause the average particle size of the polymer particles to be within a specific narrow range, for example (1) a method of controlling the composition and the amounts of emulsifying dispersants such as a surfactant or a water-soluble polymer protective colloid agent, which are added when preparing the emulsion, (2) a method of controlling the conditions under which the monomer and the polymerization catalyst are added, and (3) a method of controlling the designed nonvolatile components of the emulsion, can be adopted.

In addition, a method of controlling the size of the mixing impeller, the stirring speed, the stirring time and the like, in the polymerization apparatus, can be adopted. Further, a membrane emulsification method in which the particle size is controlled by way of passing the monomers through a porous membrane, an ultrasonic emulsification method using ultrasonic waves for the stirring method or the like can be adopted.

If a PVA-based resin is used as a dispersant during emulsion polymerization, the amount thereof blended varies somewhat depending on the type of the PVA-based resin used, the concentration of the emulsion to be synthesized and the like, but this is usually 0.1 to 80 wt %, preferably 10 to 70 wt %, particularly preferably 20 to 60 wt %, and still more preferably 20 to 57 wt %, with respect to the entire emulsion polymerization system.

If the amount of PVA-based resin blended is too low, the emulsified state of the ethylenically unsaturated monomer will be unstable, and there will be a tendency for the polymerization reactivity to decrease, and for the stability of the emulsified state of the particles in the emulsion produced by polymerization to be inferior. On the other hand, if the content of the PVA-based resin is too great, the viscosity of the reaction solution will be too high, such that uniform dispersion characteristics will be inferior, such that it will not be possible to increase the polymerization rate, and there will be a tendency for the viscosity of the emulsion produced to be too high, and thus for the yields in manufacturing to be inferior.

Polymerization catalysts ordinarily used in the field of emulsion polymerization can be used as the polymerization catalyst. Examples include water-soluble redox type polymerization catalysts such as potassium persulfate, ammonium persulfate, potassium bromate, acidic sodium sulfite, hydrogen peroxide/tartaric acid, hydrogen peroxide/iron salt, hydrogen peroxide/ascorbic acid/iron salt, hydrogen peroxide/Rongalite, hydrogen peroxide/Rongalite/iron salt and the like, which can be used alone or in mixtures of two or more. Specifically, a catalyst comprising an organic peroxide and a redox system such as "Kayabutyl B" made by Kayaku Akzo Corporation or "Kayabutyl A-50C" made by the same company can be used.

The amount of polymerization catalyst used is normally 0.01 to 10 parts by weight, preferably 0.05 to 5 parts by weight, and particularly preferably 0.1 to 3 parts by weight, with respect to 100 parts by weight of the monomer used in the polymerization. If the amount of this polymerization initiator used is too low, the polymerization rate will tend to be slow, while if this is too great, the polymerization stability tends to be inferior.

Note that there are no particular limitations on the method of blending the polymerization initiator, and this may be blended in the reaction solution batchwise at the beginning, or may be continuously added in conjunction with the progress of the polymerization.

The emulsion polymerization may be carried out in one stage or divided into two or more stages. If this is carried out in two stages, it is also possible to vary the glass transition temperatures between an inner layer formed in the first stage and an outer layer formed in the second stage by way of varying the amount of monomer charged in the first stage and second stage (charging ratio). Specifically, two-stage polymerization such as the following can be mentioned.

(1) First Stage Polymerization Step

Some of the monomer to be polymerized is charged into a reaction vessel containing a dispersion medium and a dispersant, and first stage emulsion polymerization is carried out. There are no particular limitations on the amount of monomer charged in the first stage, but this is usually approximately 1 to 50 wt %, and preferably 5 to 30 wt %, of the monomer used for polymerization. The conditions for the first stage emulsion polymerization step may be determined as appropriate according to the type and composition of monomers used, the amount of polymerization initiator used, and the like.

The temperature of the emulsion polymerization reaction is usually 30 to 90° C., and particularly preferably 40 to 80° C., and the polymerization time is preferably 1 to 4 hours. In the first stage emulsion polymerization step, the polymerization conversion rate is preferably 30% or more, and particularly preferably 60% or more.

(2) Second Stage Polymerization Step

The second stage emulsion polymerization is carried out by way of introducing the remaining monomer into the reaction vessel in which the first stage polymerization has ended. This is preferably introduced dropwise. Furthermore, a polymerization catalyst may be introduced in the second stage polymerization. The conditions for carrying out the second stage emulsion polymerization are a polymerization temperature of 40 to 80° C. and a polymerization time of 1 to 6 hours.

Further, it is also possible to use a power feed polymerization method, in which this is added dropwise with the compositional ratio of the monomers that are added dropwise continuously varied. Furthermore, polymerization may be performed while performing dropwise addition of a dispersion solution in which the monomer has already been mixed and dispersed in the presence of a PVA-based resin serving as a dispersant.

If necessary, after such a step, it is also possible to perform follow-through polymerization, normally for 1 to 6 hours. A polymerization catalyst may be introduced during such polymerization.

A molecular weight regulator may be included in such emulsion polymerization as described above, if necessary. Specific examples of molecular weight regulators include: alkyl mercaptans such as n-hexyl mercaptan, n-octyl mercaptan, t-octyl mercaptan, n-dodecyl mercaptan, t-dodecyl mercaptan, and n-stearyl mercaptan; xanthogen compounds such as dimethyl xanthogen disulfide and diisopropyl xanthogen disulfide; thiuram-based compounds such as terpinolene, tetramethyl thiuram disulfide, tetraethyl thiuram disulfide, and tetramethyl thiuram monosulfide; phenolic compounds such as 2,6-di-t-butyl-4-methylphenol and styrenated phenol; allyl compounds such as allyl alcohol; halogenated hydrocarbon compounds such as dichloromethane, dibromomethane, and carbon tetrabromide; vinyl ethers such as α-benzyloxystyrene, α-benzyloxyacrylonitrile and α-benzyloxyacrylamide; triphenylethane, pentaphenylethane, acrolein, methacrolein, thioglycolic acid, thiomalic acid, 2-ethylhexyl thioglycolate, α-methylstyrene dimer, carbon tetrachloride and the like. Note that, in the emulsion polymerization step, these molecular weight regulators can be used alone or in combinations of two or more.

Furthermore, in the polymerization step above, within a range that does not detract from the dispersion stabilizing effect of the PVA-based resin, a surfactant such as a nonionic surfactant or an anionic surfactant may also be present in the system, in addition to the dispersant contained in advance. The amount of such a surfactant blended is usually 10 wt % or less, and preferably 5 wt % or less, with respect to the entire emulsion polymerization reaction system.

Examples of nonionic surfactants include those of the polyoxyethylene-alkyl ether type, polyoxyethylene-alkylphenol type or polyoxyethylene-polyhydric alcohol ester type, esters of a polyhydric alcohol and a fatty acid, oxyethylene/oxypropylene block polymers and the like.

Examples of the anionic surfactant include sulfates of higher alcohols, alkaline salts of higher fatty acids, polyoxyethylene alkylphenol ether sulfates, alkylbenzene sulfonates, naphthalene sulfonate formalin condensate, alkyl diphenyl ether sulfonates, dialkyl sulfosuccinates, phosphate ester salts of higher alcohols and the like.

Further, plasticizers such as phthalic acid ester and phosphoric acid ester, pH adjusting agents such as sodium carbonate, sodium acetate, sodium phosphate and the like can also be used in combination.

By carrying out the emulsion polymerization as described above, an emulsion in which polymer particles derived from an ethylenically unsaturated monomer are dispersed in an aqueous dispersion medium is produced.

The solids content (corresponding to the aforementioned amount of particles) in the emulsion produced is usually 10 to 60 wt %, preferably 20 to 58 wt %, particularly preferably 30 to 55 wt %, and still more preferably 35 to 53 wt %. Note that the solids in the emulsion is a value obtained by measuring a residue produced by hot drying at 105° C. for 3 hours in a dryer.

The viscosity of the resulting emulsion is usually 100 to 20000 mPa·s, preferably 300 to 10000 mPa·s, and particularly preferably 450 to 8000 mPa·s. Note that a value measured by a B type viscometer is used for the viscosity of the emulsion.

The content of polymer particles in the secondary battery negative electrode binder composition of the present invention is usually 1 to 40 wt %, preferably 5 to 35 wt %, and particularly preferably 10 to 30 wt %, as solids. If the content of polymer particles is too low, not only will the internal resistance as a binder be high, but the coating flexibility will be insufficient, such that there will be a tendency for the active material to fall off and for the electrode to crack in conjunction with charging and discharging, such that the capacity is inferior. If the content of polymer particles is too great, it will be difficult to ensure a sufficient elastic modulus for the coating and therefore, particularly in lithium-ion secondary batteries using the alloy-based active materials, there will be a tendency for the initial discharge capacity and coulombic efficiency to be inferior, and for the cycle characteristics to be inferior.

The content of the PVA-based resin in the secondary battery negative electrode binder composition of the present invention is usually 60 to 99 wt %, preferably 65 to 90 wt %, and particularly preferably 70 to 85 wt %, as solids. If the content of PVA-based resin is too low, it will be difficult to ensure a sufficient elastic modulus for the coating and therefore, particularly in lithium-ion secondary batteries using the alloy-based active materials, there will be a tendency for the initial discharge capacity and coulombic efficiency to be inferior and for the cycle characteristics to be inferior. Furthermore, if the content of PVA-based resin is too great, not only will the internal resistance as a binder be high, but the coating flexibility will be insufficient, such that there will be a tendency for the active material to fall off and for the electrode to crack in conjunction with charging and discharging, such that the capacity is inferior.

Further, the ratio of PVA-based resin/polymer particles in the secondary battery negative electrode binder composition of the present invention is usually 60/40 to 99/1, preferably 65/35 to 95/5, particularly preferably 65/35 to 92/8, and especially preferably 65/35 to 85/15, as a ratio of solids by weight. If the ratio of PVA-based resin/polymer particles is too low, it will be difficult to ensure a sufficient elastic modulus for the coating and therefore, particularly in lithium-ion secondary batteries using the alloy-based active materials, the initial discharge capacity and coulombic efficiency will be inferior and the cycle characteristics will be inferior. If the ratio is too high, not only will the internal resistance as a binder be high, but the coating flexibility will be insufficient, such that there will be a tendency for the active material to fall off and for the electrode to crack in conjunction with charging and discharging, such that the capacity is inferior, and in industrial terms, the viscosity of the binder will be high, such that handling will be difficult.

An emulsion such as above may be provided directly to the manufacture of the negative electrode binder composition of the present invention, or a water-soluble polymer other than a PVA-based resin may be added as appropriate in order to adjust the amount of solids in the emulsion included in the binder composition, and to adjust the viscosity and the like of the emulsion produced.

Examples of water-soluble polymers other than PVA-based resins include cellulose derivatives such as methylcellulose, ethylcellulose, hydroxymethylcellulose, hydroxypropylmethylcellulose, hydroxybutylmethylcellulose, hydroxyethylcellulose, carboxymethylcellulose, aminomethylhydroxypropylcellulose, and aminoethylhydroxypropylcellulose; starch, tragacanth, pectin, glue, alginic acid or salts thereof; gelatin; polyvinyl pyrrolidone; polyacrylic acid or salts thereof, polymethacrylic acid or salts thereof; acrylamides such as polyacrylamide, and polymethacrylamide; copolymers of vinyl acetate and unsaturated acids such as maleic acid, maleic anhydride, acrylic acid, methacrylic acid, itaconic acid, fumaric acid, crotonic acid; copolymers of styrene and the aforementioned unsaturated acids; copolymers of vinyl ether and the aforementioned unsaturated acids; and salts or esters of the aforementioned unsaturated acids and copolymers, natural polysaccharides such as carrageenan, xanthan gum, sodium hyaluronate, locust bean gum, tara gum, guar gum, tamarind seed gum and the like; and cellulose derivatives are preferred.

[Polymer Particles]

The average particle size of the polymer particles in the present invention is 50 nm to 600 nm. Preferably, this is 200 to 500 nm. Note that, for the average particle size of the particles, the average particle size in the volume distribution was used, which was measured with a dynamic light scattering type particle size distribution analyzer, a total of five times at one minute after ultrasonic irradiation treatment, with a measurement time of three minutes.

[Secondary Battery Negative Electrode Binder Composition]

The secondary battery negative electrode binder composition of the present invention comprises the emulsion described above.

As described above, in the negative electrode binder composition of the present invention, it is preferred that a PVA-based resin is blended separately from the PVA-based resin serving as a dispersant in the emulsion included in the binder composition. Since the modified PVA-based resin containing a structural unit having a primary hydroxyl group on a side chain, and in particular a side chain 1,2-diol structural unit, has low crystallinity, by separately including the modified PVA-based resin containing a structural unit having a primary hydroxyl group on a side chain, and in particular a side chain 1,2-diol structural unit, in the aqueous solution of the PVA-based resin for the emulsion, it is possible to give an aqueous paste, which is the electrode binder composition, stable viscosity, and thus work efficiency can be improved.

<Other Components>

In the binder composition of the present invention, it is possible to blend a coating material used in coating films, a compounding agent used in molding resins or the like. For example, light stabilizers, ultraviolet absorbers, thickeners, leveling agents, thixotropic agents, antifoaming agents, freezing stabilizers, matting agents, crosslinking reaction catalysts, pigment, curing catalyst, crosslinking agents {boric acid, methylolated melamine, zirconium carbonate, diisopropoxytitanium bis (triethanolaminate) and the like}, antiskinning agents, dispersants (excluding the aforementioned dispersants), wetting agents, antioxidants, ultraviolet absorbers, rheology control agents, film forming aids, rust preventers, dyes, plasticizers, lubricants, reducing agents, preservatives, anti-mildew agents, deodorants, anti-yellowing agents, antistatic agents or charge control agents and the like may be mentioned. These may be selected and combined and blended depending on the individual purposes. Note that, if the binder composition contains these compounding agents, the organic component of the compounding agent contained therein is included in the solids content of the binder composition.

The amount of the aforementioned compounding agent blended is usually 10 parts by weight or less, and preferably 5 parts by weight or less, with respect to 100 parts by weight of the solids content of the emulsion in the binder composition.

The aforementioned resin is a resin that allows charging and discharging, even in lithium-ion secondary batteries using an electrolytic solution which does not readily form a stable SEI film such as PC (propylene carbonate), which is to say, a resin having an SEI complement function. In particular, in lithium-ion secondary batteries using PC-based electrolytic solution, using this resin may possibly be expected to have a large effect in terms of the durability of negative electrode and safety, as well as usage in cold areas and the like.

[Secondary Battery Negative Electrode]

The secondary battery negative electrode of the present invention comprises at least the binder composition for the secondary battery negative electrode of the present invention and a negative electrode alloy-based active material. The secondary battery negative electrode of the present invention can normally be manufactured by mixing the binder composition and the alloy-based active material, so as to prepare a secondary battery negative electrode slurry, coating this slurry on a current collector, and drying.

The secondary battery negative electrode of the present invention can be applied in various secondary batteries and, for example, can be applied in lithium-ion secondary batteries, lithium ion polymer secondary batteries, lead storage batteries, nickel/hydrogen storage batteries, nickel/cadmium storage batteries, nickel/iron storage batteries, nickel/zinc storage batteries, silver oxide/zinc storage batteries, sodium batteries, aluminum-air batteries and the like. Hereafter, a lithium-ion secondary battery will be described in particular, by way of example.

There are no particular limitations on the active material used for the secondary battery negative electrode, as long as it contains at least one element capable of forming an alloy with lithium, and specifically one or more element selected from the group consisting of tin, aluminum, silicon, bismuth, zinc, arsenic, antimony and lead can be used. In the present invention, the negative electrode active material can be used in a powdered state, and may comprise simple elements or may comprise oxides and alloys of these. Among these, as they alloy with large amounts of lithium per unit weight, silicon and tin, as well as oxides and alloys containing these, are preferred, and oxides and alloys containing silicon are particularly preferred. Examples of alloys containing silicon or tin include silicon-titanium alloys, silicon-nickel alloys, tin-iron alloys, tin-nickel alloys, tin-copper alloys, tin-zinc alloys, tin-titanium alloys and the like.

The content of the active material in the slurry is 10 to 95 wt %, preferably 20 to 80 wt %, and particularly preferably 35 to 65 wt %.

The average particle size of the active material is usually 5 nm to 100 µm, preferably 20 nm to 50 µm, and particularly preferably 50 nm to 25 µm. Note that a value measured by the laser diffraction type particle size distribution measurement (laser diffraction scattering method) is used for the average particle size of the active material.

In the negative electrode slurry, as calculated for the solids in the binder composition, the content ratio of the active material and the binder composition, with respect to 100 parts by weight of the active material, is usually 0.1 to 20 parts by weight, preferably 0.1 to 15 parts by weight, and particularly preferably 0.1 to 10 parts by weight. If the content of the negative electrode binder composition is too great, the internal resistance tends to increase. On the other hand, if it is too low, desired binding strength of the active material to itself, and the adhesion strength to the current collector, will not be produced, and thus there is a tendency for the electrode to become unstable, and for the charge/discharge cycle characteristics to be inferior.

The negative electrode slurry may contain other substances, in addition to the alloy-based active material and the negative electrode binder composition. Other substances may include, for example, conductive auxiliaries, supporting electrolytes (lithium salts), ion conductive polymers and the like. If an ion conductive polymer is included, a polymerization initiator for polymerizing the polymer may be included. The blending ratios for these components are common, known ranges. For these blending ratios as well, adjustments may be made by way of making reference to public knowledge regarding lithium-ion secondary batteries, as appropriate.

The term "conductive auxiliary" refers to a substance that is blended in order to improve conductivity. Conductive auxiliaries include powders of carbon such as graphite, acetylene black, Ketjenblack, and various carbon fibers such as vapor grown carbon fiber (VGCF (registered trademark)), and super gloss nanotubes. If it is necessary to further improve the conductivity of the binder as a result of the various blending when fabricating the secondary battery negative electrode of the present invention, a conductive auxiliary is preferably blended, and if VGCF (registered trademark) is used as the conductive auxiliary, the active material will be effectively utilized, and loss of charge/discharge capacity caused by using large amounts of the binder can be suppressed. Here, the amount of the conductive auxiliary blended, with respect to the total mass of the active material layer, is preferably 1 to 20 wt %, and particularly preferably 1 to 10 wt %.

Further, in consideration of workability and the like when fabricating the negative electrode, the negative electrode slurry may be prepared with a solvent added, in order to adjust the viscosity, adjust the amount of solids in the binder composition or the like. The same organic solvents as described above can be used as this solvent.

A thickener may be added to the negative electrode slurry, separately from the binder composition, in order to improve the dispersion of the active material, the negative electrode binder composition, the conductive auxiliary and the like, or to improve leveling when coating. There are no particular limitations on the type of thickener, but primarily water-soluble polymers are suitable for use, because they are miscible with PVA-based resins and water is suitably used as the dispersion medium for the emulsion composition. Note that, in the present invention, the water-soluble polymer excludes not only the PVA-based resin having a structural unit having a primary hydroxyl group on its side chain, but other PVA-based resins as well.

Examples of the water-soluble polymers other than PVA-based resins include cellulose derivatives such as methylcellulose, ethylcellulose, hydroxymethylcellulose, hydroxypropylmethylcellulose, hydroxybutylmethylcellulose, hydroxyethylcellulose, carboxymethylcellulose, aminomethylhydroxypropylcellulose, and aminoethylhydroxypropylcellulose; starch, tragacanth, pectin, glue, alginic acid or salts thereof; gelatin; polyvinyl pyrrolidone; polyacrylic acid or salts thereof, polymethacrylic acid or salts thereof; acrylamides such as polyacrylamide, and polymethacrylamide; copolymers of vinyl acetate and unsaturated acids such as maleic acid, maleic anhydride, acrylic acid, acrylic acid, methacrylic acid, itaconic acid, fumaric acid, and crotonic acid; copolymers of styrene and the aforementioned unsaturated acids; copolymers of vinyl ether and the aforementioned unsaturated acids; and salts or esters of the aforementioned unsaturated acids and copolymers, natural polysaccharides such as copolymers, carrageenan, xanthan gum, sodium hyaluronate, locust bean gum, tara gum, guar gum, and tamarind seed gum, and cellulose derivatives are preferred.

The amount of thickener used in the negative electrode slurry, with respect to the solids content of the negative electrode slurry, is usually 0.01 to 5 wt %, preferably 0.1 to 4 wt %, and particularly preferably 0.5 to 4 wt %. If the amount used for the slurry is too low, the dispersion stability of the active material, the negative electrode binder, the conductive auxiliary and the like will be inferior, and the electrode will be inhomogeneous, and thus it will tend to be difficult to achieve stable charging and discharging. On the other hand, if the amount is too great, the viscosity of the negative electrode slurry will be too high, and not only will it tend to be difficult to uniformly coat the current collector when fabricating the negative electrode, but the internal resistance of the battery fabricated will increase, such that the charge/discharge capacity will tend to be inferior.

A stirrer, deaerator, bead mill, high-pressure homogenizer or the like can be used to mix the negative electrode binder composition and the active material, as well as compounding agents and solvents that are used as necessary.

By coating the negative electrode slurry prepared as described above on a current collector and drying, the secondary battery negative electrode of the present invention (hereinafter also referred to simply as "the negative electrode of the present invention") can be manufactured. If necessary, after coating, the density can be adjusted by pressing.

Current collectors that are used as current collectors in the negative electrodes of lithium-ion secondary batteries can be used as the current collector used in the negative electrode of the present invention. Specifically, foils of metals such as copper, SUS, or nickel, etching metal foils, expanded metals and the like can be used, and these can be selected for use as appropriate, according to the intended type of electric storage device.

A negative electrode layer can be formed by applying the negative electrode slurry on such a current collector and drying. Examples of methods for coating the negative electrode slurry on the current collector include the doctor blade method, the reverse roll method, the comma bar method, the gravure method, the air knife method and the like. Furthermore, in terms of the conditions for drying treatment of the negative electrode slurry coating film, the treatment temperature is usually 20 to 180° C., and preferably 50 to 150° C. Further, the treatment time is usually 1 to 120 minutes, and preferably 5 to 60 minutes.

The thickness of the active material layer (the thickness of the coating layer on one side) is usually 1 to 300 μm, preferably 2 to 100 μm, and particularly preferably 2 to 30 μm.

Because the negative electrode produced using the secondary battery negative electrode binder composition of the present invention is excellent in terms of the dispersion of the alloy-based active material and the binding between the active material and the current collector, an effect is achieved in which the active material will not readily separate or fall off.

[Secondary Battery]

A lithium-ion secondary battery having a negative electrode fabricated using the secondary battery negative electrode binder composition of the present invention will be described, as an example of the secondary battery of the present invention.

The lithium-ion secondary battery has at least a positive electrode, a negative electrode, an electrolytic solution, and a separator.

An aprotic polar solvent that dissolves a lithium salt is used for the electrolytic solution. While there are no particular limitations, lower, chain carbonic acid esters such as dimethyl carbonate, ethyl methyl carbonate or diethyl carbonate, which are solvents having low viscosity are added to a cyclic carbonic acid ester-based solvent having high dielectric constant and high boiling point such as ethylene carbonate or propylene carbonate and used. Specific examples include ethylene carbonate, chloroethylene carbonate, trifluoropropylene carbonate, butylene carbonate, diethyl carbonate, dimethyl carbonate, ethyl methyl carbonate, methyl propyl carbonate, isopropyl methyl carbonate, ethyl propyl carbonate, isopropyl ethyl carbonate, butyl methyl carbonate, butyl ethyl carbonate, dipropyl carbonate, 1,2-dimethoxyethane, γ-butyrolactone, tetrahydrofuran, 2-methyltetrahydrofuran, sulfolane, 3-methylsulfolane, 2,4- dimethylsulfolane, 1,3-dioxolane, methyl acetate, ethyl acetate, methyl formate, ethyl formate and the like, which are preferably used mixed.

Inorganic salts such as $LiClO_4$, $LiPF_6$, $LiBF_4$, $LiAsF_6$, LiCl, and LiBr and organic salts such as $LiCF_3SO_3$, $LiN(SO_2CF_3)_2$, $LiN(SO_2C_2F_5)_2$, $LiC(SO_2CF_3)_3$, and $LiN(SO_3CF_3)_2$ which are ordinarily used as electrolytes for non-aqueous electrolytic solutions may be used as the lithium salt for the electrolyte. Among these, use of $LiPF_6$, $LiBF_4$ or $LiClO_4$ is preferred.

There are no particular limitations on separator, and nonwoven polyolefin fabrics, porous film, glass filters, polyaramid films, nonwoven fabrics made from PVA-based resins or the like can be used.

There are no particular limitations on the positive electrode, and common known positive electrodes can be combined.

For example, olivine type lithium-iron phosphate, lithium-cobalt oxide, lithium-manganese oxide, lithium-nickel oxide, ternary lithium-nickel-cobalt-manganese oxide, lithium-nickel-cobalt-aluminum composite oxides and the like can be used as the positive electrode active material.

The current collector of the positive electrode may be a metal material such as aluminum, copper, nickel, tantalum, stainless steel, titanium or the like, which can be selected for use as appropriate, according to the intended type of electric storage device.

There are no particular limitations on the structure of the secondary battery, and any conventionally known configuration/structure can suitably be applied, such as layered type (flat type) batteries and wound type (cylindrical type) batteries. Furthermore, in terms of the format of the electrical connection (electrode structure) in the lithium-ion secondary battery, both non-bipolar type (internal parallel connection type) batteries and bipolar type (internal series connection type) batteries can suitably be applied.

Based on the use of the negative electrode binder composition of the present invention, the lithium-ion secondary battery produced as described above is excellent in terms of the dispersion of the alloy-based active material and the binding between the alloy-based active material and the current collector, and because the active material will not readily separate or fall off, it is possible to stably produce high charge/discharge capacities and an effect is produced in which charge/discharge cycle characteristics are excellent.

EXAMPLES

Hereafter, the present invention is described in further detail by way of examples, but so long as there is no departure from the gist thereof, the present invention is not limited to the following examples. Note that, unless otherwise specified, in the examples, "parts" or "%" refers to weight basis.

Analysis Method

The PVA-based resins manufactured in the following examples and comparative examples were analyzed by the following methods.

(1) Degree of Saponification (Mol %)

This was analyzed based on the alkali consumption required for hydrolysis of the residual vinyl acetate and 3,4-diacetoxy-1-butene.

(2) Viscosity-Average Degree of Polymerization

This was measured according to JIS K 6726.

(3) Side Chain 1,2-Diol Structural Unit Content (Amount of Modification) (Mol %)

This was measured with $^1$H-NMR (400 MHz, proton NMR, solvent: deuterium oxide solution, temperature: 50° C.) using an AVANCE III HD 400 made by Bruker Corporation and calculated from the integral values, based on the resultant NMR chart.

Polymerization Example 1: Polymerization of the Base Emulsion

A separable flask, equipped with a reflux condenser, a stirrer, a dropping funnel, and a thermometer, was charged with: 1005.2 parts of water, serving as the dispersion medium; 179.2 parts of a modified PVA-based resin including a side chain 1,2-diol structural unit having the structure shown in the structural formula (1a) above (degree of saponification: 99.1 mol %; viscosity-average degree of polymerization: 1200; content ratio of the 1,2-diol structural unit represented by the structural formula (1a) above: 6 mol %), serving as a dispersant; and 0.59 parts of sodium acetate, and after dissolving under stirring at 95° C. for 2 hours, the temperature in the flask was cooled to 75° C.

In this warm bath, mixed monomers of butyl acrylate (BA) and styrene (St) (mixed weight ratio: BA/St=45/55) in the amount of 28.0 parts, serving as the monomers for first stage emulsion polymerization, 5.60 parts of an aqueous solution of sodium bisulfite (5%) and 18.48 parts of an aqueous solution of ammonium persulfate (1%), serving as a polymerization initiators, were added and first stage emulsion polymerization was started. Polymerization was carried out for 1 hour while maintaining the reaction temperature at 75° C. to 80° C.

Next, the second stage emulsion polymerization was carried out. While maintaining the temperature of the reaction system in which the first stage emulsion polymerization had been carried out in the range of 75° C. to 80° C., 252.0 parts of a mixed monomer having the same composition as above, serving as the monomers for emulsion polymerization in the second stage, was added dropwise over 3.5 hours. During this dropwise addition, 36.96 parts of an aqueous solution of ammonium persulfate (1%) was divided into 14 parts, which were admixed every 15 minutes. Thereafter, polymerization was continued for 90 minutes while maintaining the temperature at 75° C. During this period, 6.16 parts of an aqueous solution of ammonium persulfate (1%) was divided into two parts, which were admixed every 45 minutes.

After the second stage emulsion polymerization, the reaction temperature was lowered to 50° C., and follow-through polymerization was carried out for 1 hour. During this follow-through polymerization, 2.8 parts of an aqueous solution of t-butyl hydroperoxy (10%) and 3.4 parts of an aqueous solution of L-ascorbic acid (10%) were each divided into two parts, which were admixed every 30 minutes. Thereafter, this was cooled to room temperature to produce an emulsion in which polymer particles having a mixed composition of butyl acrylate (BA) and styrene (St) were dispersed in an aqueous solution of modified PVA-based resin containing a side chain 1,2-diol structural unit having the structure represented by the structural formula (1a) above. The solids content in this emulsion was 29.6%, and the weight ratio of the PVA-based resin to the polymer particles was 39/61.

Polymerization Example 2: Polymerization of the Base Emulsion

A separable flask, equipped with a reflux condenser, a stirrer, a dropping funnel, and a thermometer, was charged with: 1016.0 parts of water, serving as the dispersion medium; 256.0 parts of a modified PVA-based resin including a side chain 1,2-diol structural unit having the structure shown in the structural formula (1a) above (degree of saponification: 99.1 mol %; viscosity-average degree of polymerization: 1200; content ratio of the 1,2-diol structural unit represented by the structural formula (1a) above: 6 mol %), serving as a dispersant; and 0.42 parts of sodium acetate, and after dissolving under stirring at 95° C. for 2 hours, the temperature in the flask was cooled to 75° C.

In this warm bath, mixed monomers of butyl acrylate (BA) and methyl methacrylate (MMA) (mixed weight ratio: BA/MMA=71/29) in the amount of 20.0 parts, serving as the monomers for first stage emulsion polymerization, 4.00 parts of an aqueous solution of sodium bisulfite (5%) and 13.20 parts of an aqueous solution of ammonium persulfate (1%), serving as a polymerization initiators, were added and first stage emulsion polymerization was started. Polymerization was carried out for 1 hour while maintaining the reaction temperature at 75° C. to 80° C.

Next, the second stage emulsion polymerization was carried out. While maintaining the temperature of the reaction system in which the first stage emulsion polymerization had been carried out in the range of 75° C. to 80° C., 180.0 parts of a mixed monomer having the same composition as above, serving as the monomers for emulsion polymerization in the second stage, was added dropwise over 3.5 hours. During this dropwise addition, 26.39 parts of an aqueous solution of ammonium persulfate (1%) was divided into 14 parts, which were admixed every 15 minutes. Thereafter, polymerization was continued for 90 minutes while maintaining the temperature at 75° C. During this period, 4.4 parts of an aqueous solution of ammonium persulfate (1%) was divided into two parts, which were admixed every 45 minutes.

After the second stage emulsion polymerization, the reaction temperature was lowered to 50° C., and follow-through polymerization was carried out for 1 hour. During this follow-through polymerization, 2.0 parts of an aqueous solution of t-butyl hydroperoxy (10%) and 2.4 parts of an aqueous solution of L-ascorbic acid (10%) were each divided into two parts, which were admixed every 30 minutes. Thereafter, this was cooled to room temperature to produce an emulsion in which polymer particles having a mixed composition of butyl acrylate (BA) and methyl methacrylate (MMA) were dispersed in an aqueous solution of modified PVA-based resin including the side chain 1,2-diol structural unit having the structure represented by the structural formula (1a) above. The solids content in this emulsion was 29.9%, and the weight ratio of the PVA-based resin to the polymer particles was 56/44.

Polymerization Example 3: Polymerization of the Base Emulsion

A base emulsion was produced by a method similar to Polymerization Example 2, except that a mixed monomer of butyl acrylate (BA) and styrene (St) (mixing weight ratio: BA/St=45/55) was used for monomer for emulsion polymerization.

Polymerization Example 4: Polymerization of the Base Emulsion

A base emulsion was produced by a method similar to Polymerization Example 2 except that the PVA-based resin used as a dispersant was changed (degree of saponification: 99.1 mol %; viscosity-average degree of polymerization: 600; content ratio of 1,2-diol structural units shown in the structural formula (1a) above: 8 mol %) and mixed monomers of butyl acrylate (BA) and styrene (St) (mixing weight ratio: BA/St=27.5/72.5) were used as the monomers for emulsion polymerization.

Manufacturing Example 1: Manufacture of the Binder Solution

The base emulsion prepared in Polymerization Example 1 was apportioned, and purified water for dilution and a 10% aqueous solution of a modified PVA-based resin including a side chain 1,2-diol structural unit having the structure shown in the structural formula (1a) above (degree of saponification: 99.1 mol %; viscosity-average degree of polymerization: 1200; content ratio of the 1,2-diol structural unit represented by the structural formula (1a) above: 6 mol %) were added, so as to prepare a 10% binder solution. At this time, this was prepared so that, in the solids content of the binder, the weight ratio of (1) PVA-based resin and (2) the polymer particles having the mixed composition of butyl acrylate (BA) and styrene (St) was (1)/(2)=90/10.

Manufacturing Example 2: Manufacture of the Binder Solution

A binder solution was prepared in the same manner as Manufacturing Example 1, other than the fact that this was prepared so that, in the solids content of the binder, the weight ratio of (1) PVA-based resin and (2) the polymer particles having the mixed composition of butyl acrylate (BA) and styrene (St) was (1)/(2)=80/20.

Manufacturing Example 3: Manufacture of the Binder Solution

A binder solution was prepared in the same manner as Manufacturing Example 1, other than the fact that this was prepared so that, in the solids content of the binder, the weight ratio of (1) PVA-based resin and (2) the polymer particles having the mixed composition of butyl acrylate (BA) and styrene (St) was (1)/(2)=70/30.

Manufacturing Example 4: Manufacture of the Binder Solution

A separable flask, equipped with a reflux condenser, a stirrer, a dropping funnel, and a thermometer, was charged with: 1016.0 parts of water, serving as the dispersion medium; 256.0 parts of a PVA-based resin including a side chain 1,2-diol structural unit having the structure shown in the structural formula (1a) above (degree of saponification: 99.1 mol %; viscosity-average degree of polymerization: 1200; content ratio of the 1,2-diol structural unit represented by the structural formula (1a) above: 6 mol %), serving as a dispersant; and 0.42 parts of sodium acetate, and after dissolving under stirring at 95° C. for 2 hours, the temperature in the flask was cooled to 75° C.

In this warm bath, mixed monomers of butyl acrylate (BA) and styrene (St) (mixed weight ratio: BA/St=45/55) in the amount of 20.0 parts, serving as the monomers for first stage emulsion polymerization, 4.00 parts of an aqueous solution of sodium bisulfite (5%) and 13.20 parts of an aqueous solution of ammonium persulfate (1%), serving as a polymerization initiators, were added and first stage emulsion polymerization was started. Polymerization was carried out for 1 hour while maintaining the reaction temperature at 75° C. to 80° C.

Next, the second stage emulsion polymerization was carried out. While maintaining the temperature of the reaction system in which the first stage emulsion polymerization had been carried out in the range of 75° C. to 80° C., 180.0 parts of a mixed monomer having the same composition as above, serving as the monomers for emulsion polymerization in the second stage, was added dropwise over 3.5 hours. During this dropwise addition, 26.39 parts of an aqueous solution of ammonium persulfate (1%) was divided into 14 parts, which were admixed every 15 minutes. Thereafter, polymerization was continued for 90 minutes while maintaining the temperature at 75° C. During this period, 4.4 parts of an aqueous solution of ammonium persulfate (1%) was divided into two parts, which were admixed every 45 minutes.

After the second stage emulsion polymerization, the reaction temperature was lowered to 50° C., and follow-through polymerization was carried out for 1 hour. During this follow-through polymerization, 2.0 parts of an aqueous solution of t-butyl hydroperoxy (10%) and 2.4 parts of an aqueous solution of L-ascorbic acid (10%) were each divided into two parts, which were admixed every 30 minutes. Thereafter, this was cooled to room temperature to produce an emulsion in which polymer particles having a mixed composition of butyl acrylate (BA) and styrene (St) were dispersed in an aqueous solution of modified PVA-based resin containing a side chain 1,2-diol structural unit having the structure represented by the structural formula (1a) above. The solids content in this emulsion was 29.7%, and the weight ratio of the PVA-based resin to the polymer particles was 56/44.

When actually used for an electrode binder, a binder diluted to 10% in advance was used.

Manufacturing Example 5: Manufacture of the Binder Solution

The base emulsion prepared in Polymerization Example 2 was apportioned, and purified water for dilution and a 10% aqueous solution of a modified PVA-based resin including a side chain 1,2-diol structural unit having the structure shown in the structural formula (1a) above (degree of saponification: 99.1 mol %; viscosity-average degree of polymerization: 1200; content ratio of the 1,2-diol structural unit represented by the structural formula (1a) above: 6 mol %) were added, so as to prepare a 10% binder solution. At this time, this was prepared so that, in the solids content of the binder, the weight ratio of (1) PVA-based resin and (2) the polymer particles was (1)/(2)=80/20.

Manufacturing Example 6: Manufacture of the Binder Solution

The base emulsion prepared in Polymerization Example 3 was apportioned, and purified water for dilution and a 10% aqueous solution of a modified PVA-based resin including a side chain 1,2-diol structural unit having the structure shown in the structural formula (1a) above (degree of saponification: 99.1 mol %; viscosity-average degree of polymerization: 1200; content ratio of the 1,2-diol structural unit represented by the structural formula (1a) above: 6 mol %) were added, so as to prepare a 10% binder solution. At this time, this was prepared so that, in the solids content of the binder, the weight ratio of (1) PVA-based resin and (2) the polymer particles was (1)/(2)=80/20.

Manufacturing Example 7: Manufacture of the Binder Solution

The base emulsion prepared in Polymerization Example 4 was apportioned, and purified water for dilution and a 10% aqueous solution of a modified PVA-based resin including a side chain 1,2-diol structural unit having the structure shown in the structural formula (1a) above (degree of saponification: 99.1 mol %; viscosity-average degree of polymerization: 1200; content ratio of the 1,2-diol structural unit represented by the structural formula (1a) above: 6 mol %) were added, so as to prepare a 10% binder solution. At this time, this was prepared so that, in the solids content of the binder, the weight ratio of (1) PVA-based resin and (2) the polymer particles was (1)/(2)=80/20.

Example 1: Fabrication of the Electrode

<Fabrication of the Battery Negative Electrode Using a Silicon Active Material>

A paste having a solids concentration of 28.0% was produced by mixing 65 parts of silicon powder (sold by: Alfa Aesar; average particle size: 50 nm) serving as an active material; 15 parts of acetylene black ("Denka Black" made by Denki Kagaku Kogyo Co., Ltd.), serving as a conductivity auxiliary; and further 3 parts, as calculated for the solids, of carboxymethylcellulose #2260 (made by Daicel FineChem Ltd.) prepared as a 1.72% aqueous solution, serving as a dispersant, subsequent to addition of purified water when appropriate, by using a planetary kneader ("Awatori Rentaro" made by Thinky Corporation) (after mixing at 2000 rpm for 4.5 minutes, this was further defoamed at 2200 rpm for 0.5 minutes).

After adding, to the resulting paste, 17 parts, as calculated for the solids, of the binder solution (10%) fabricated in Manufacturing Example 1 as a negative electrode binder, and purified water when appropriate, this was further mixed under the similar conditions using the planetary kneader, to produce an active material paste having a solids concentration of 19.8%.

Next, the active material paste was applied at a coating speed of 10 mm/sec, using a 25 μm applicator and a coating machine ("Control Coater (Coating Machine)" made by Imoto machinery Co., Ltd) to the surface of a rolled copper foil (made by UACJ Foil Corporation; thickness: 18 μm) serving as a current collector. This was dried at 80° C. for 2 hours and then vacuum dried at 120° C. for 4 hours to produce a battery electrode.

(Charge/Discharge Test)

A 2032-type coin cell was used for the outer layer of the battery for evaluation. The battery electrode produced was punched out at a size of 14 mm in diameter, and after further performing vacuum drying at 80° C. for 12 hours, this was loaded into a glove box. With the battery negative electrode fabricated as described above as a working electrode and metallic lithium (diameter: 13 mm) as a counter electrode, the electrodes were arranged facing each other, with a separator (diameter: 18 mm) made of a porous polypropylene membrane with a thickness of 16 μm therebetween. A solution prepared by dissolving $LiPF_6$, serving as the electrolyte, at a concentration of 1 mol/liter in a solvent in which ethylene carbonate and diethylene carbonate were mixed at a volume ratio of 3:7, was used as the electrolytic solution. The outer layer container was covered by a stainless steel cap with polypropylene packing therebetween, and fixed in place, and the battery can was sealed to fabricate a half cell, which was used as an evaluation battery.

The evaluation battery fabricated was left standing for 24 hours in a 50° C. environment. With this kept at 50° C., charging and discharging were subsequently repeated under constant current conditions, at a rate of 0.1 C (1 C=4200 mA/g) with respect to the working electrode. At this time, the initial discharge capacity and coulombic efficiency were adopted as the battery performance evaluation items.

(Cycle Characteristics)

After repeated charging and discharging under the aforementioned conditions, the discharge capacity was measured in the fifth cycle, and the capacity retention, which was found by the following formula, was adopted for cycle characteristics.

Capacity retention (%)=(discharge capacity in the fifth cycle)/(initial discharge capacity)×100

As this value is closer to 100%, there is less deterioration of the electrode due to charging and discharging, indicating that the battery is operating stably.

The resulting battery performance evaluation results are set forth in Table 1.

Example 2

A negative electrode was fabricated by a method similar to Example 1 except that the binder solution prepared in Manufacturing Example 2 was used as a negative electrode binder, and the battery performance was evaluated.

Example 3

A negative electrode was fabricated by a method similar to Example 1 except that the binder solution prepared in Manufacturing Example 3 was used as a negative electrode binder, and the battery performance was evaluated.

Comparative Example 1

An electrode was fabricated by a method similar to Example 1 except that the binder solution prepared in Manufacturing Example 4 was used as the electrode binder, and the battery performance was evaluated.

Comparative Example 2

A negative electrode was fabricated by a method similar to Example 1 except that the base emulsion prepared in Polymerization Example 1 was used as the binder solution for the electrode binder, and the battery performance was evaluated. At that time, a base emulsion diluted to 10% in advance was used as a binder solution.

Comparative Example 3

An electrode was fabricated by way of a method similar to that in Example 1, other than a 10% aqueous solution of a modified PVA-based resin including a side chain 1,2-diol structural unit having a structure represented by the structural formula (1a) above (degree of saponification: 99.1 mol %; viscosity-average degree of polymerization: 1200; content ratio of the 1,2-diol structural unit represented by the structural formula (1a) above: 6 mol %) being used for the electrode binder, and the battery performance was evaluated.

TABLE 1

| | PVA-based resin/polymer particles in the binder weight ratio | Initial discharge capacity mAh/g | Initial coulomb efficiency % | Capacity retention % |
|---|---|---|---|---|
| Example 1 | 90/10 | 3984.4 | 84.2 | 102.0 |
| Example 2 | 80/20 | 3904.1 | 83.9 | 102.0 |
| Example 3 | 70/30 | 3781.7 | 82.4 | 106.9 |
| Comparative Example 1 | 56/44 | 3229.8 | 69.6 | 60.2 |
| Comparative Example 2 | 39/61 | 2785.7 | 62.1 | 42.0 |
| Comparative Example 3 | 100/0 | 3895.8 | 87.0 | 83.2 |

Based on the results shown in Table 1, it is clear that, in terms of the weight ratio of the resin solids, when the ratio of the PVA-based resin to the polymer particles in the binder is in the range of 60/40 to 99/1, the initial discharge capacity, initial coulombic efficiency, and capacity retention are all good.

In contrast, in Comparative Examples 1 and 2, the capacity and the coulombic efficiency are seen to decrease as the number of polymer particles increases. Meanwhile, in the binder composition of Comparative Example 3, which contains only PVA-based resin and no polymer particles at all, although the initial discharge capacity and initial coulombic efficiency were high, the capacity retention was low.

Accordingly, it is understood that, when fabricating an electrode using an alloy-based active material, good charge/discharge characteristics can be exhibited by designing the weight ratio of the PVA-based resin to polymer particles in the binder to be within the preferred range.

Example 4

(Evaluation of Coating Properties)

<Fabrication of Binder Coating>

The binder solution produced in Manufacturing Example 5 was cast on a polyethylene terephthalate film to a film thickness with a design value of 100 μm. Then, this was left to stand for 48 hours in an environment of 23° C.×50% RH, whereafter this was dried for 1 hour in an air dryer at 80° C. Further, this was vacuum dried for 48 hours in the co-presence of phosphorus pentoxide, in a vacuum dryer at 80° C.

When the volatile component of the coating produced was measured with a thermogravimetric analyzer (TGA), it was found that, in the range of 50 to 200° C., the weight loss rate was 0.5% or less. The measurement conditions are shown below.

Measurement range: 50 to 300° C.

Measurement mode: after being left to stand for 10 minutes at 50° C., the temperature was increased at a constant rate as far as 300° C. at 10° C./min Volatile component (%)=(weight of sample at 200° C.)/(weight of sample at 50° C.)×100

<Thermal Analysis of Electrode Binder>

Differential calorimetric analysis was performed on the binder coating produced by the method described above, by way of the following method. Note that, the value of the reversible heat flow in the second cycle measured in the modulation mode was adopted as the glass transition temperature of the polymer particles.

Analyzer: "DSC Q 2000" made by TA Instruments Inc.
Measurement range
1st: −30 to 215° C.
2nd: −30 to 230° C.
Rate of temperature increase: 5° C./min
Rate of temperature decrease: 10° C./min
Modulation period: every 60 seconds
Temperature amplitude: +/−0.80° C.

<Analysis of Mechanical Properties of Electrode Binder Coating (Mandrel Test)>

The binder coating produced by the method described above was subjected to a flexural resistance test in accordance with JIS K 56005-1 (Mechanical properties of coatings, Section 1: Flexural resistance (cylindrical mandrel method)). Three test samples were prepared, and the value for the mandrel test rod on which any of these broke was used. The smallest test rod was 2 mmφ (diameter), and the evaluation of "does not break even at 2 mmφ" was given when none of the three broke.

In the similar manner as in Example 1, a negative electrode for a battery was fabricated using a silicon active material, and a charge/discharge test was carried out to evaluate battery performance. The resulting battery performance evaluation results are set forth in Table 2.

Example 5

A negative electrode was fabricated by a method similar to Example 4 except that the binder solution prepared in Manufacturing Example 6 was used as a negative electrode binder, and the battery performance was evaluated.

Example 6

A negative electrode was fabricated by a method similar to Example 4 except that the binder solution prepared in Manufacturing Example 7 was used as a negative electrode binder, and the battery performance was evaluated.

TABLE 2

| | Glass transition temperature of the polymer particles ° C. | Mandrel test | Initial discharge capacity mAh/g | Initial coulomb efficiency % |
|---|---|---|---|---|
| Example 4 | −20.51 | does not break even at 2 mm φ | 3998 | 86.2 |
| Example 5 | 29.99 | does not break even at 2 mm φ | 3904.1 | 83.9 |
| Example 6 | 52.51 | does not break even at 2 mm φ | 3840.9 | 83.8 |

From the results shown in Table 2, it is clear that, when the weight ratio of the PVA-based resin to the polymer particles is within the stipulated range of the present invention, and the glass transition temperature of the polymer particles is −40 to 60° C., flexural resistance, the initial discharge capacity and the initial coulombic efficiency are all good.

Accordingly, when fabricating a negative electrode using an alloy-based active material, by designing the weight ratio of the PVA-based resin to polymer particles to be within the preferred range, and further designing the glass transition temperature of the polymer particles to be within the preferred range, it is possible to produce a stable negative electrode active material layer, which can better follow volumetric changes, and to exhibit high charge/discharge characteristics.

INDUSTRIAL APPLICABILITY

In secondary batteries having a negative electrode produced using the secondary battery negative electrode binder composition of the present invention, particularly for electrodes using an alloy-based active material, a stable negative electrode active material layer is produced, which can follow volumetric changes, and the excellent effects of improving high charge/discharge capacity and cycle characteristics are produced. Accordingly, the negative electrode binder composition of the present invention is useful as a negative electrode binder composition for improving the performance of a secondary battery such as a lithium-ion secondary battery.

The invention claimed is:

1. A secondary battery negative electrode binder composition, the binder composition being suitable for use in a secondary battery negative electrode containing silicon or tin as an element capable of forming an alloy with lithium as an active material,
the at least one element capable of forming an alloy with lithium comprising silicon and/or tin but not comprising zinc,
the binder composition comprising an emulsion in which polymer particles of polymerized ethylenically unsaturated monomer are dispersed in an aqueous solution of a polyvinyl alcohol-based resin, wherein
the ratio of the polyvinyl alcohol-based resin/polymer particles is 60/40 to 99/1, as a weight ratio of resin solids.

2. The secondary battery negative electrode binder composition according to claim 1, wherein the polymer particles have a glass transition temperature of −40 to −60 ° C.

3. The secondary battery negative electrode binder composition according to claim 1, wherein the polyvinyl alcohol-based resin comprises a modified polyvinyl alcohol-based resin containing a structural unit having a primary hydroxyl group on a side chain.

4. A secondary battery negative electrode comprising the secondary battery negative electrode binder composition according to claim 1.

5. A secondary battery negative electrode according to claim 4, comprising a cellulose derivative as a thickener.

6. A secondary battery comprising a secondary battery negative electrode according to claim 4.

7. The secondary battery negative electrode binder composition according to claim 2, wherein the polyvinyl alcohol-based resin comprises a modified polyvinyl alcohol-based resin containing a structural unit having a primary hydroxyl group on a side chain.

8. A secondary battery negative electrode comprising the secondary battery negative electrode binder composition according to claim 2.

9. A secondary battery negative electrode comprising the secondary battery negative electrode binder composition according to claim 3.

10. A secondary battery negative electrode comprising the secondary battery negative electrode binder composition according to claim 7.

11. A secondary battery negative electrode according to claim 8, comprising a cellulose derivative as a thickener.

12. A secondary battery negative electrode according to claim 9, comprising a cellulose derivative as a thickener.

13. A secondary battery negative electrode according to claim 10, comprising a cellulose derivative as a thickener.

14. A secondary battery comprising a secondary battery negative electrode according to claim 5.

15. A secondary battery comprising a secondary battery negative electrode according to claim 8.

16. A secondary battery comprising a secondary battery negative electrode according to claim 9.

17. A secondary battery comprising a secondary battery negative electrode according to claim 10.

18. A secondary battery comprising a secondary battery negative electrode according to claim 11.

19. A secondary battery comprising a secondary battery negative electrode according to claim 12.

20. A secondary battery comprising a secondary battery negative electrode according to claim 13.

* * * * *